United States Patent
Kuang et al.

(10) Patent No.: US 10,455,902 B2
(45) Date of Patent: Oct. 29, 2019

(54) CHILD'S SAFETY BELT CONNECTION BUCKLE

(71) Applicant: GOODBABY CHILD PRODUCTS CO., LTD., Kunshan, Jiangsu (CN)

(72) Inventors: Zhiyong Kuang, Jiangsu (CN); Xiaogang Huan, Jiangsu (CN)

(73) Assignee: GOODBABY CHILD PRODUCTS CO., LTD., Kunshan, Jiangsu (CN)

( * ) Notice: Subject to any disclaimer, the term of this patent is extended or adjusted under 35 U.S.C. 154(b) by 94 days.

(21) Appl. No.: 15/306,984

(22) PCT Filed: Dec. 29, 2014

(86) PCT No.: PCT/CN2014/095260
§ 371 (c)(1),
(2) Date: Oct. 26, 2016

(87) PCT Pub. No.: WO2015/172568
PCT Pub. Date: Nov. 19, 2015

(65) Prior Publication Data
US 2017/0049192 A1    Feb. 23, 2017

(30) Foreign Application Priority Data

May 13, 2014   (CN) .................... 2014 2 0243400 U

(51) Int. Cl.
*A44B 11/25*    (2006.01)
*B60R 22/10*    (2006.01)

(52) U.S. Cl.
CPC ...... *A44B 11/2523* (2013.01); *A44B 11/2549* (2013.01); *A44B 11/2561* (2013.01); *B60R 22/105* (2013.01)

(58) Field of Classification Search
CPC ............ A44B 11/2523; A44B 11/2549; A44B 11/2561; A44B 11/25; B60R 22/105; B60R 22/18
See application file for complete search history.

(56) References Cited

U.S. PATENT DOCUMENTS 4,597,141 A * 7/1986 Wier .................. A44B 11/2523
24/633
4,621,394 A * 11/1986 Wier .................. A44B 11/2523
24/641

(Continued)

FOREIGN PATENT DOCUMENTS

| CN | 102595954 | 7/2012 |
| CN | 203860572 | 10/2014 |

(Continued)

OTHER PUBLICATIONS

International Search Report dated Apr. 3, 2015.

*Primary Examiner* — Robert Sandy
*Assistant Examiner* — Louis A Mercado
(74) *Attorney, Agent, or Firm* — Baker, Donelson, Bearman, Caldwell & Berkowitz, PC

(57) ABSTRACT

A child's safety belt connection buckle with a belt buckle inserted into an inserting space in an inserting base in the horizontal direction, and locked by a locking mechanism. The locking mechanism has a sliding member capable of moving reciprocally along the horizontal direction, and a locking member capable of moving reciprocally in a direction perpendicular to the horizontal direction. The locking mechanism has a locking position and an unlocking position. When the locking mechanism is at the locking position, the belt buckle is pressed against the sliding member, and the locking member is buckled with the belt buckle. When the (Continued)

locking mechanism is at the unlocking position, the locking member is separated from the belt buckle and pressed against the sliding member.

10 Claims, 5 Drawing Sheets

(56) References Cited

U.S. PATENT DOCUMENTS

| | | | | |
|---|---|---|---|---|
| 4,622,727 A * | 11/1986 | Wier | ............... | A44B 11/2523 24/641 |
| 5,067,212 A * | 11/1991 | Ellis | ............... | A44B 11/2523 24/633 |
| 5,496,068 A * | 3/1996 | Ball | ............... | A44B 11/2523 24/633 |
| 5,596,795 A * | 1/1997 | Beisswenger | ...... | A44B 11/2523 24/633 |
| 5,813,097 A | 9/1998 | Woellert et al. | | |
| 5,996,193 A * | 12/1999 | Gill | ............... | A44B 11/2523 24/633 |
| 6,055,708 A * | 5/2000 | Ellis | ............... | A44B 11/2523 24/636 |
| 6,463,639 B1 * | 10/2002 | Mori | ............... | A44B 11/2523 24/629 |
| 7,159,285 B2 * | 1/2007 | Karlsson | ............ | A44B 11/2549 24/579.11 |
| 7,520,036 B1 * | 4/2009 | Baldwin | ............ | A44B 11/2523 24/635 |
| 7,596,837 B1 * | 10/2009 | Tucker | ............... | A44B 11/2549 24/630 |
| 8,215,716 B2 * | 7/2012 | Akaike | ............... | A44B 11/2523 297/468 |
| 9,545,133 B1 * | 1/2017 | Wu | ............... | A44B 11/2542 |
| 9,781,977 B2 * | 10/2017 | Jin | ................... | A44B 11/2561 |
| 9,867,432 B1 * | 1/2018 | Wu | ............... | A44B 11/2549 |

FOREIGN PATENT DOCUMENTS

| | | | |
|---|---|---|---|
| CN | 203913651 | 11/2014 | |
| EP | 0211718 | 2/1987 | |
| WO | WO-2006061505 A1 * | 6/2006 | ......... A44B 11/2519 |

* cited by examiner

CHILD'S SAFETY BELT CONNECTION BUCKLE

FIELD OF INVENTION

The present invention relates to a child's safety belt connection buckle mounted on a child stroller or a child car seat for securely strapping a child.

BACKGROUND OF THE INVENTION

One of the child's safety belt connection buckles in the prior art comprises an inserting base with an inserting space and a belt buckle, the belt buckle being capable of inserting into the inserting space along the horizontal direction and being locked by means of a locking mechanism. For instance, the safety belt buckle disclosed by Patent of Publication No. CN202907985U, comprises an inserting base, a base mounted within the inserting base and having an inserting space, a left plug and a right plug for connecting the safety belt and detachably inserted into the inserting space of the base, a locking device for locking the left plug and the right plug within the base when the left plug and the right plug being inserted into the base, a push-out member provided within the inserting space of the base and rotationally connected to a pin shaft, the pin shaft being moveably provided on the base, and an end of the pin shaft extending beyond the base to connect with the locking device, and the locking device being controlled by the push-out member and possessing a locking state and an unlocking state. The push-out member may rotate, and may achieve the lock of the lock device only when the left plug and the right plug both are inserted into the base. When only one plug is inserted, the push-out member rotates, the pin shaft may not move, and the locking device cannot be locked. This prevents the situation that the lock happens when only one plug is inserted, and avoids the existing potential safety hazards when installing the child safety seat.

SUMMARY OF THE INVENTION

The technical problem solved by the present invention is to provide a child's safety belt connection buckle.

In order to solve the above technical problem, the technical scheme employed by the present invention is: a child's safety belt connection buckle, comprising an inserting base with an inserting space and a belt buckle, the belt buckle is inserted into the inserting space along the horizontal direction and is locked by means of a locking mechanism; the locking mechanism comprises a sliding member arranged on the inserting base capable of moving reciprocally along the horizontal direction, and a locking member arranged on the inserting base capable of moving reciprocally in a direction perpendicular to the horizontal direction; the locking mechanism has a locking position and an unlocking position; when the locking mechanism is at the locking position, the belt buckle is pressed against the sliding member, and the locking member is buckled with the belt buckle, and when the locking mechanism is at the unlocking position, the locking member is separated from the belt buckle and pressed against the sliding member.

In some implementations, an elastic restoring member is provided between the sliding member and the inserting base such that the sliding member has a trend to move towards the belt buckle, and an elastic member is provided between the locking member and the inserting base such that the locking member has a trend to move towards the sliding member or the belt buckle.

In some implementations, an elastic member is provided between the locking member and the inserting base such that the locking member has a trend to move towards the sliding member or the belt buckle; the elastic member is a spring leaf; one end of the elastic member is connected with the inserting base, and another end of the elastic member is connected with the locking member.

In some implementations, an unlocking control mechanism is provided on the inserting base to control the unlocking of the locking mechanism, the unlocking control mechanism comprising an unlocking button slidably provided on the inserting base along the horizontal direction, and a button elastic element provided between the unlocking button and the inserting base to make the unlocking button move outwards to reset, an inclined guide slope being provided on the unlocking button, a guide column being provided on the locking member, and the guide column is pressed on the guide slope.

In some further implementations, a button space is on the inserting base, within which the unlocking button and the button elastic element are located.

In some implementations, a base is within the inserting base, on which the inserting space being formed.

In some further implementations, an accommodating groove is provided on the base for accommodating the sliding member, and a sliding groove is provided on the base for accommodating the locking member to slide.

In some yet further implementations, the base comprises an upper base sheet and a lower base sheet assembled together, the inserting space is formed between the upper base sheet and the lower base sheet, and the sliding member is located within the inserting space.

In some implementations, the locking member is partly inserted into the inserting space when at the locking position.

In some implementations, the locking member is provided with a locking groove or a locking portion, and correspondingly, the belt buckle is provided with a locking portion matching with the locking groove or a locking groove matching with the locking portion.

The scope of the present invention is not limited to technical schemes specifically combined by the above technical features, and should encompass other technical schemes formed by any combination of the above technical features or the equivalent features thereof. For example, the technical scheme is formed by substituting between the above technical features and, but not limited to, the technical features with similar functions disclosed by the present invention.

Due to the use of the above-mentioned technical schemes, the present invention has the following advantages over the prior art: the present invention offers a structure adopting a new locking manner, the belt buckle is inserted into the inserting space and meanwhile pressed against the sliding member to move such that the sliding member is separated from the locking member, and the locking member is thus released and can be buckled with the belt buckle.

Figure 1:
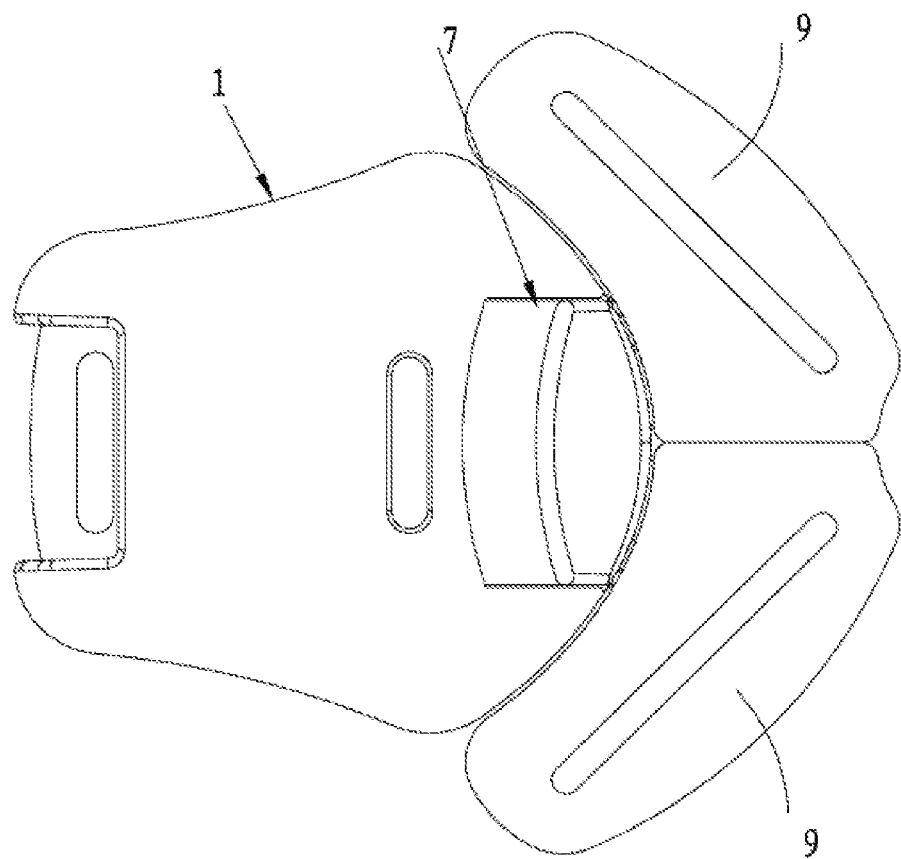
FIG. 1 is a top view of the present invention.

wherein: 1—inserting base; 2—base; 21—upper base sheet; 22—lower base sheet; 3—sliding member; 4—elastic restoring member; 5—locking member; 51—locking part; 52—guide column; 6—elastic member; 7—guide slope; 8—button elastic member; 9—belt buckle; 91—locking groove.

DETAILED DESCRIPTION OF EXEMPLARY EMBODIMENTS

Embodiment 1

As shown in FIG. 1 and FIGS. 3-6, a child's safety belt connection buckle comprises, an inserting base 1 with an inserting space and a belt buckle 9, the belt buckle 9 is formed by fixedly connecting an upper inserting base cover and a lower inserting base cover each other. The belt buckle 9 is inserted into the inserting space along the horizontal direction and locked by means of a locking mechanism.

In the figures of this embodiment, the inserting base 1 has a base 2 therein, and the inserting space is formed on the base 2.

The locking mechanism comprises a sliding member 3 arranged on the inserting base 1 capable of moving reciprocally along the horizontal direction, and a locking member 5 arranged on the inserting base 1 capable of moving reciprocally in a direction perpendicular to the horizontal direction.

There is one sliding member 3, and there may be one or two belt buckle(s), for example when being used for the safety belt of a car seat, there is just one belt buckle; and if being used for the safety belt of a child seat, there may be two belt buckles, and in this embodiment, there are two belt buckles.

The locking mechanism has a locking position and an unlocking position. When the locking mechanism is at the locking position, the belt buckle 9 is pressed against the sliding member 3, that is to say, the locking member 5 is able to be buckled with the belt buckle 9, respectively. When the locking mechanism is at the unlocking position, the locking member 5 is separated from the belt buckle 9 and pressed against the sliding member 3.

An elastic restoring member 4 is provided between the sliding member 3 and the inserting base 1 such that the sliding member 3 has a trend to move towards the belt buckle 9. When the belt buckle 9 is inserted into the inserting space, it is needed to overcome the elastic force of the elastic restoring member 4. When the belt buckle 9 is drawn out from the inserting space, the sliding member 3 is reset by the elastic force of the elastic restoring member 4. An elastic member 6 is provided between the locking member 5 and the inserting base 1 such that the locking member 5 has a trend to move towards the sliding member 3 or the belt buckle 9. When the locking mechanism is at the locking position, the sliding member 6 makes the locking member 5 to be stably buckled with the belt buckle 9. When the locking mechanism is at the unlocking position, the sliding member 6 makes the locking member 5 to be stably pressed against the sliding member 3.

The elastic member 6 is a spring leaf, one end of the elastic member 6 is connected with the inserting base 1, and another end of the elastic member 6 is connected with the locking member 5. This results that the size of the inserting base 1 in the direction vertical to the horizontal direction is relatively thin.

An unlocking control mechanism is provided on the inserting base 1 to control the unlocking of the locking mechanism, and the unlocking control mechanism comprises an unlocking button 7 slidably provided on the inserting base 1 along the horizontal direction, and a button elastic element 8 provided between the unlocking button 7 and the inserting base 1 to make the unlocking button 7 move outwards to reset, an inclined guide slope 71 is on the unlocking button 7, a guide column 52 is on the locking member 5, and the guide column 52 is pressed on the guide slope 71. A button space is on the inserting base 1, within which the unlocking button 7 and the button elastic element 8 are located.

The base 2 is made of metal material, and comprises an upper base sheet 21 and a lower base sheet 22 assembled together, the inserting space is formed between the upper base sheet 21 and the lower base sheet 22, and the sliding member 3 is located within the inserting space. The lower base sheet 22 comprises a horizontal portion, and an upright portion vertical to the horizontal portion and extending from two sides of the horizontal portion upwardly. An accommodating groove is provided on the horizontal portion for accommodating the sliding member 3, and a sliding groove is provided on the upright portion for supporting the locking member 5 to slide. The sliding direction of the sliding member 3 in the accommodating groove and the sliding direction of the locking member 5 in the sliding groove are vertical to each other.

The locking member 5 is partly inserted into the inserting space when at the locking position. Specifically, a locking portion 51 is provided on the locking member 5, and a locking slot 91 matching with the locking portion 51 is provided on the belt buckle 5.

When the belt buckle 9 is inserted into the inserting space, the belt buckle 9 is pressed against the sliding member 3 to move, the locking portion 51 of the locking member 5 is inserted into the locking slot 91 of the belt buckle 9, and the unlocking button 7 is pushed outwardly by the button elastic member 8, to achieve the lock of the safety belt connection buckle, that is to say, the safety belt connection buckle is locked by the locking mechanism. During unlocking, the elastic force of the button elastic member 8 is overcame by pressing the unlocking button 7, the guide slope 71 pushes the guide column 52 to drive the locking member 5 upwardly, that is to say, under the cooperation of the guide slope 71 and the guide column 52, the locking member 5 is lifted upwardly such that the locking portion 51 and the locking slot 91 are separated from each other, the sliding member 3 is reset in the horizontal direction under the action of the elastic restoring member 4, and at this moment, the locking member 5 is pushed against the sliding member 3.

Embodiment 2

Figure 2:
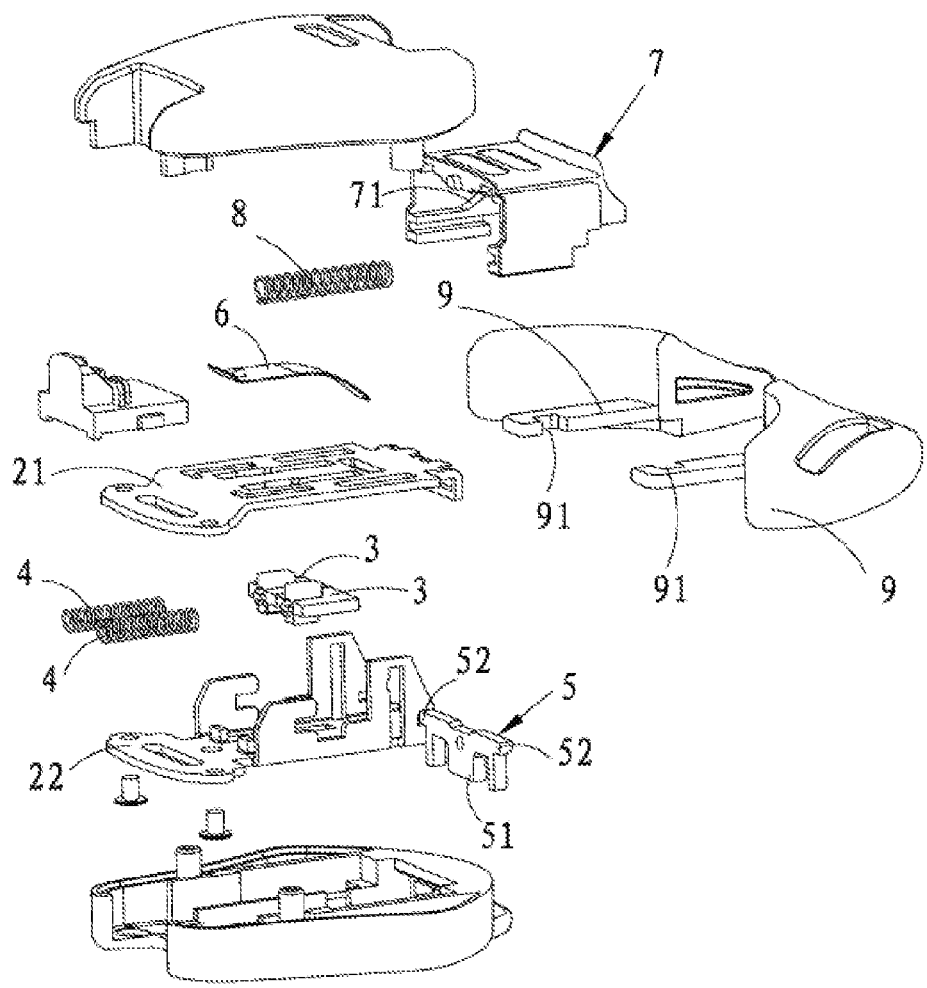
FIG. 2 is an exploded view of the present invention.
Figure 3:
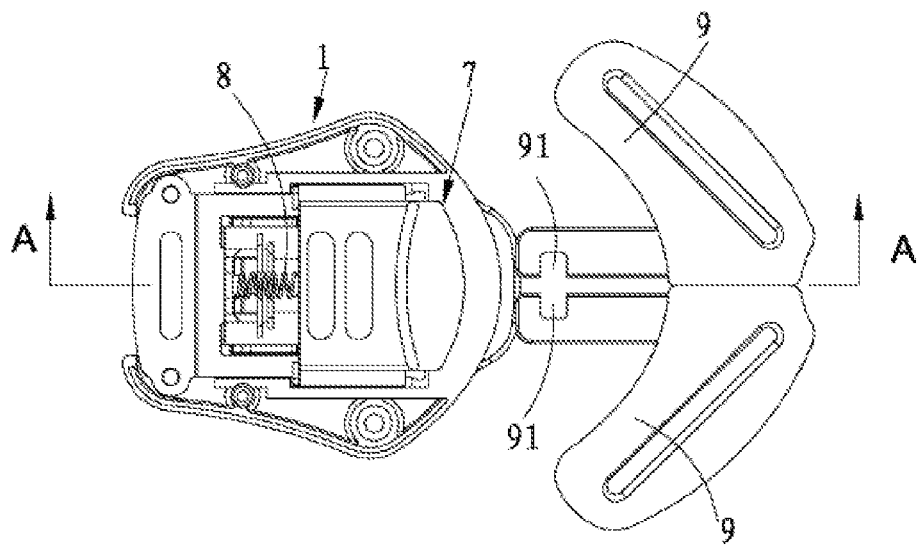
FIG. 3 is a schematic view of the internal structure of the inserting base before the belt buckle being inserted (the structure is viewed from top)
Figure 4:
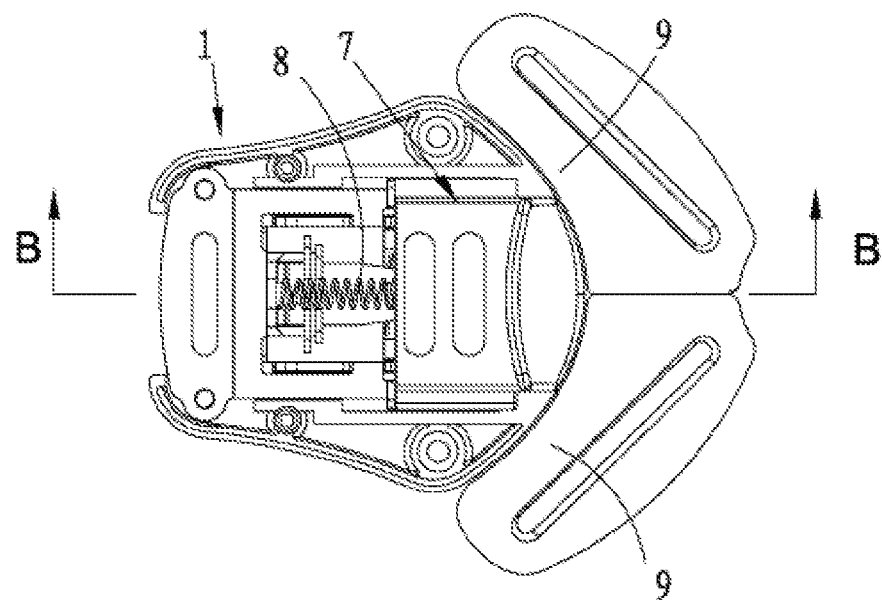
FIG. 4 is a schematic view of the internal structure of the inserting base after the belt buckle being inserted (the structure is viewed from top)
Figure 5:
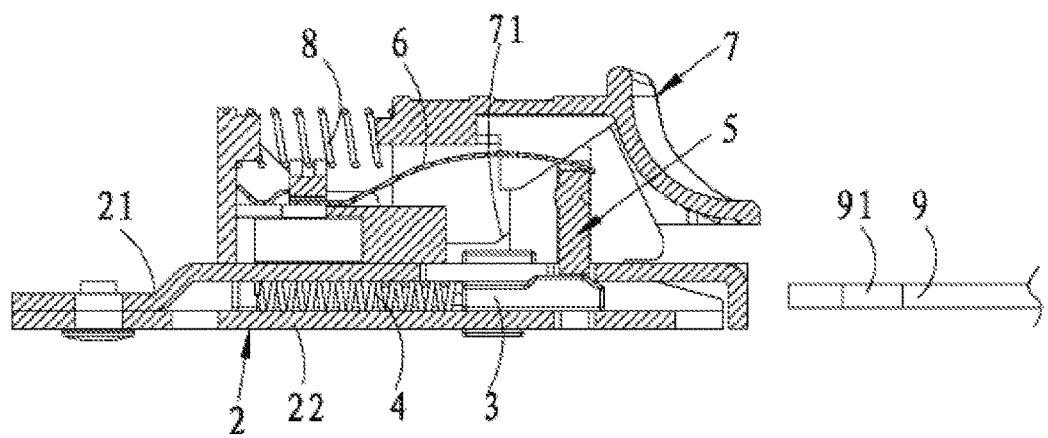
FIG. 5 is a schematic view of the internal structure of the inserting base before the belt buckle being inserted (the structure is viewed from front)
Figure 6:
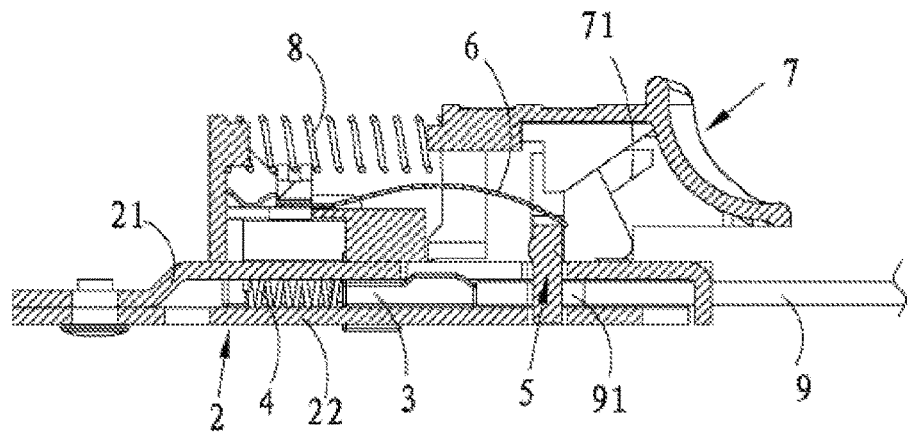
FIG. 6 is a schematic view of the internal structure of the inserting base after the belt buckle being inserted (the structure is viewed from front)
Figure 7:
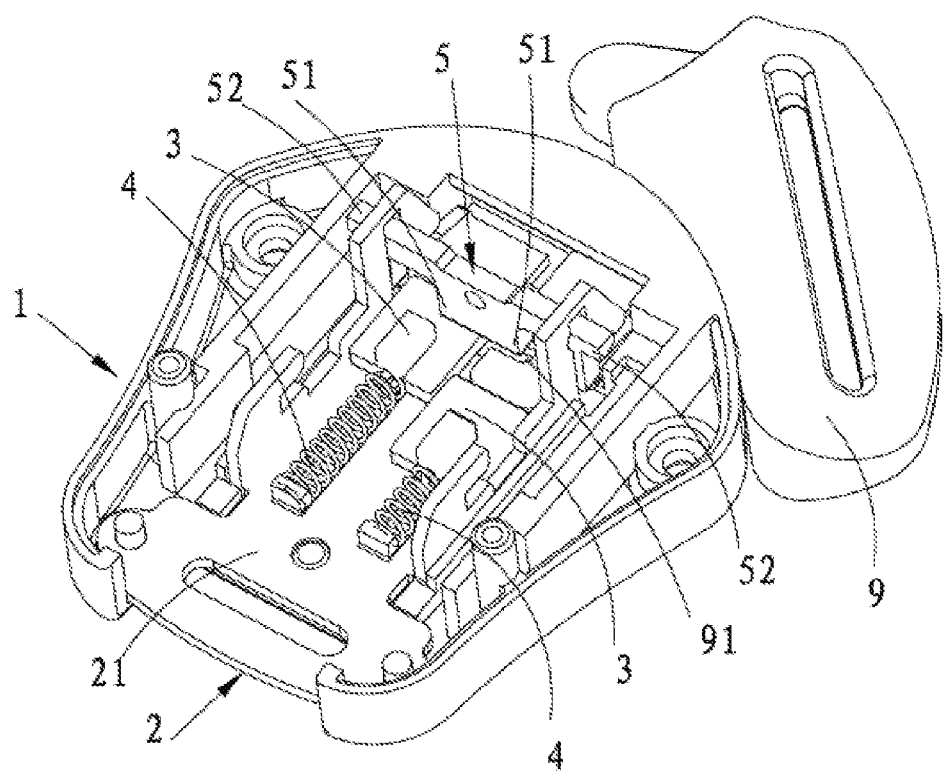
FIG. 7 is a stereoscopic schematic view of the internal structure of the inserting base after the belt buckle being inserted.

As shown in FIGS. 2 and 7, Embodiment 2 is mainly distinguished from Embodiment 1 by that there are two sliding members 3, and correspondingly, two elastic restoring members 4. Moreover, the two sliding members 3 correspond to the two belt buckles 9, respectively.

When any one of the two belt buckles 9 is inserted into the inserting space, only one sliding member 3 is pushed to move and the other one does not move, the locking member 5 cannot slide down, such that the locking mechanism cannot lock. When both the two belt buckles 9 are inserted into the inserting space, both the two sliding member 3 are pushed to move, the locking member 5 slides down, and the locking mechanism locks and is safely used. Similarly, during unlocking, the elastic force of the button elastic member 8 is overcome by pressing the unlocking button 7, and under the cooperation of the guide slope 71 and the guide column 52, the locking member 5 is lifted upwardly, and the belt buckles 9 are pushed outwardly under the action of the elastic restoring member 4 and sliding member 3. When releasing the unlocking button 7, the locking member 5 is pushed against the sliding member 3 under the action of the button elastic member 8.

The embodiments described above are only for illustrating the technical concepts and features of the present invention, and intended to make those skilled in the art being able to understand the present invention and thereby implement it, and should not be concluded to limit the protective scope of this invention. Any equivalent variations or modifications according to the spirit of the present invention should be covered by the protective scope of the present invention.

What is claimed is:

1. A child's safety belt connection buckle, comprising:
    an inserting base with an inserting space; and
    a belt buckle, wherein the belt buckle is adapted to be inserted into the inserting space along a horizontal direction and locked by means of a locking mechanism, wherein the locking mechanism comprises
        a sliding member arranged on the inserting base, said sliding member adapted to move reciprocally along the horizontal direction, and
        a locking member arranged on the inserting base, said locking member adapted to move reciprocally in a direction perpendicular to the horizontal direction;
    further wherein the locking mechanism has a locking position and an unlocking position;
    further wherein when the locking mechanism is at the locking position, the belt buckle is pressed against the sliding member, and the locking member is buckled with the belt buckle, and when the locking mechanism is at the unlocking position, the locking member is separated from the belt buckle and pressed against the sliding member;
    further wherein the child's safety belt connection buckle comprises two belt buckles, a locking portion is provided on the locking member, and a locking slot matching with the locking portion is provided on each belt buckle, when the locking mechanism is at the locking position, the locking portion of the locking member is inserted into the locking slot of the belt buckle, the locking member is buckled with the two belt buckles;
    further wherein an unlocking control mechanism is provided on the inserting base to control unlocking of the locking mechanism, the unlocking control mechanism comprising
        an unlocking button slidably provided on the inserting base along the horizontal direction,
        a button elastic element provided between the unlocking button and the inserting base configured to make the unlocking button move outwards to reset,
        an inclined guide slope on the unlocking button, and
        a guide column on the locking member, wherein the guide column is pressed on the guide slope.

2. The child's safety belt connection buckle according to claim 1, further wherein when the locking mechanism is at the unlocking position, at least a part of the sliding member is located within the inserting space of the inserting base.

3. The child's safety belt connection buckle according to claim 1, further comprising:
    an elastic restoring member provided between the sliding member and the inserting base such that the sliding member has a tendency to move towards the belt buckle; and
    an elastic member provided between the locking member and the inserting base such that the locking member has a tendency to move towards the sliding member or the belt buckle.

4. The child's safety belt connection buckle according to claim 1, further comprising:
    an elastic member provided between the locking member and the inserting base such that the locking member has a tendency to move towards the sliding member or the belt buckle, wherein one end of the elastic member is connected with the inserting base, and another end of the elastic member is connected with the locking member.

5. The child's safety belt connection buckle according to claim 4, wherein the elastic member is a spring leaf.

6. The child's safety belt connection buckle according to claim 1, wherein a button space is on the inserting base, within which the unlocking button and the button elastic element are located.

7. The child's safety belt connection buckle according to claim 1, further comprising a base within the inserting base, on which the inserting space being formed.

8. The child's safety belt connection buckle according to claim 7, wherein an accommodating groove provided on the base for accommodating the sliding member, and a sliding groove is provided on the base for accommodating the locking member to slide.

9. The child's safety belt connection buckle according to claim 7, wherein the base comprises an upper base sheet and a lower base sheet assembled together, the inserting space being formed between the upper base sheet and the lower base sheet.

10. The child's safety belt connection buckle according to claim 1, wherein the locking member is partly inserted into the inserting space when at the locking position.

* * * * *